(12) United States Patent
Smith

(10) Patent No.: US 6,314,988 B1
(45) Date of Patent: Nov. 13, 2001

(54) FLOOD CONTROL VALVE ASSEMBLY

(76) Inventor: Karl Smith, 1620 S. Ocean Blvd., Apt. 5-K, Pompano Beach, FL (US) 33062

( * ) Notice: Subject to any disclaimer, the term of this patent is extended or adjusted under 35 U.S.C. 154(b) by 0 days.

(21) Appl. No.: 09/580,568

(22) Filed: May 30, 2000

Related U.S. Application Data (63) Continuation-in-part of application No. 09/251,214, filed on Feb. 16, 1999, now Pat. No. 6,095,179.

(51) Int. Cl.⁷ .......................... F16K 13/10; F16K 15/04; F16K 31/22
(52) U.S. Cl. ................. 137/247.23; 137/362; 137/433; 137/519.5
(58) Field of Search .................... 137/247.15, 247.21, 137/247.23, 519.5, 362, 433

(56) References Cited

U.S. PATENT DOCUMENTS

| | | | | |
|---|---|---|---|---|
| 174,874 | * | 3/1876 | Thorp | 137/247.21 |
| 187,364 | * | 2/1877 | Downey | 137/519.5 |
| 193,605 | * | 7/1877 | Hay | 137/519.5 X |
| 592,690 | * | 10/1897 | Bragger | 137/433 X |
| 1,318,545 | * | 10/1919 | Dehn | 137/247.23 |
| 1,356,530 | * | 10/1920 | Kuhn | 137/247.21 X |
| 1,700,636 | * | 1/1929 | Kuhn | 137/247.21 X |
| 1,756,976 | * | 5/1930 | Ehlers | 137/247.21 X |
| 2,616,512 | * | 11/1952 | Coon | 137/519.5 X |
| 2,638,308 | * | 5/1953 | Kell | 137/519.5 |
| 3,850,191 | * | 11/1974 | Brown | 137/271 |
| 4,046,161 | * | 9/1977 | Cherry | 137/247.17 |
| 4,266,605 | * | 5/1981 | LaBorde et al. | 137/519.5 X |

FOREIGN PATENT DOCUMENTS

| | | | | |
|---|---|---|---|---|
| 436806 | * | 10/1935 | (BE) | 137/519.5 |
| 70883 | * | 11/1915 | (CH) | 137/519.5 |

* cited by examiner

*Primary Examiner*—John Rivell
(74) *Attorney, Agent, or Firm*—Malloy & Malloy, P.A.

(57) ABSTRACT

A flood control valve assembly designed to be removably connected to the outer or exposed end of a drain pipe and structured to allow water to enter the drain pipe in the conventional fashion but prevent water from issuing from the open, outer end of the drain pipe such as during heavy rain and/or flood conditions. The valve assembly includes a tubular housing having a hollow interior and oppositely disposed open ends which define a path of liquid flow through the housing. The housing is removably secured on the interior of the drain pipe immediately adjacent to the open end thereof and further includes a buoyant material valve member movably mounted within the housing and being positionable into an out of a closed position relative to a valve seat secured adjacent to the outer end of the housing dependent upon the direction of water flow through the housing.

22 Claims, 7 Drawing Sheets

FLOOD CONTROL VALVE ASSEMBLY

CLAIM OF PRIORITY

The present application is a continuation-in-part application of application, Ser. No. 09/251,214, filed on Feb. 16, 1999, now U.S. Pat. No. 6,095, 179, and which is incorporated herein in its entirety, by reference.

BACKGROUND OF THE INVENTION

1. Field of the Invention

This invention relates to a valve assembly designed to be removably attached to the outer, exposed end of a drain or sewer pipe and installed in any of a variety of locations, specifically including, but not limited to, a commode, water closet, toilet or like facility, wherein water and/or sewage is normally directed therefrom into a sewer or drain system. The valve assembly of the present invention is structured to prevent back flow of water through the drain or sewer pipe and into the building, home or like structure, through the commode, toilet, etc., which may normally occur during heavy rains, floods or other conditions which have a tendency to cause an overload or backup of the main sewer system.

2. Description of the Related Art

Drain pipes and sewer pipes are well known. Normally, such pipes are permanently installed in a variety of different locations such as basements, parking lots, and underground parking structures in particular, garages, roofs of large buildings, etc. in order to direct water collected therein to a network of conduits or pipes, located beneath the ground, basement or like area, which define conventional main drain or sewer systems. Typically, when located in a basement, garage, etc., the outer, open ends of standing drain pipes are covered with a perforated or aperture plate which serves to prevent relatively large objects from entering the drain pipe and possibly causing a clogging of the drain pipe and/or associated sewer facilities. However, when a drain pipe is connected to a toilet, commode or similar type structure, the corresponding end of the drain pipe remains uncovered and in direct fluid communication with the interior of the toilet to which it is attached. Regardless of the locations of such drain or sewer pipes, the occurrence of a back flow of water therethrough is relatively common. More specifically, during unusual conditions such as heavy rain, thawing of ice or snow, floods, etc. large amounts of water can accumulate within the main sewer or drain facilities. The unusually increased quantity of such water results in the likelihood that the water will "back flow" through the individual drains connected to the common drain facility, thereby causing the water to enter and flood certain areas in which the vertical or horizontal drain pipes are located, such as basements, underground parking garages, and the like. Naturally, this is a serious problem which has long been endured due to the fact that drain pipes and like drain facilities are necessary to maintain the surrounding areas dry under normal circumstances.

Whenever such back flow of water occurs, there is a distinct possibility of damage to any item or items located in the surrounding areas in which the permanently installed drain or sewer pipes are located. In addition, if the drain(s) installed within an underground parking structure over-flow with water, drivers and their passengers are considerably inconvenienced, as there might not be a dry parking space available. In addition, such persons are not permitted to enter or exit their vehicles without getting their feet wet, which is not only undesirable, but might lead to a slip and fall type of injury.

Even more of an inconvenience is the back flow of water and the resulting flooding or over-flow of water from a toilet, commode, water closet, etc., located within a building, or dwelling, particularly when waste or sewage is contained within the back flow of water issuing from the toilet, commode, etc. The design and structure of an assembly to prevent such back flow is rendered even more difficult since waste, disposable paper, biodegradable objects and like products are intended to be flushed through these facilities in an unobstructed manner so that such waste products can enter and be disposed of through the main sewer system.

Recognizing the problems of the type set forth above, numerous attempts have been made to construct various devices aimed at preventing the back flow of water through an existing drain pipe, while still allowing water to flow into the main drain or sewer system, in a conventional and intended manner. Such devices normally involve some type of check valve which are not adequately adapted for use with or within a standing, permanently installed drain or sewer pipe. More in particular, conventional check valves are typically constructed to include specifically formed valves or valve housing components, which cannot readily be installed within a conventional drain pipe or drain facility without significant difficulty. Also, conventional check valves are typically designed and structured in a manner which makes it difficult or impossible to remove and replace worn parts without damaging the existing drain pipe or facility. In addition, it is believed that devices known in the art which attempt to address the aforementioned back flow of water in drain pipes have all been directed to assemblies which require that the outer end of the permanently installed drain pipe be exposed as a preliminary step, such as by drilling the concrete, asphalt or other material around the drain pipe, in order to install such devices whether on the drain pipe or into the floor, pavement or other foundation in which the drain pipe is located. In addition, once such known devices are installed, the floor, pavement or other foundation in which the drain pipe is located must then be patched, and consequently, such known devices are also permanently installed. As a result, such permanent or fixed installation or attachment of a check valve or other such known device to the existing drain facilities is cumbersome, complex and time consuming, and in general, is not an economically efficient nor workable solution for use with or adaptation to a vast majority of permanently installed drain pipes.

Also, when dealing with devices specifically intended to prevent the back flow of water and/or sewage through toilets, commodes, etc. additional structural considerations are involved in that a toilet or commode is specifically intended to pass waste, disposable paper and other semi-solid objects through the toilet bowl and into the main sewer or drain system, as set forth above. Accordingly, conventional valve assemblies normally intended for use in preventing the back flow of water in the manner set forth above, are not adaptable for use with toilets or commodes, because of the necessary and intended passage of the semi-solid materials into the main drain system.

Therefore, there is a recognized need in this art for a flood control valve assembly which is specifically adapted to be attached to a permanently or fixedly installed drain pipe or sewer pipe in a manner which eliminates the need for digging into or otherwise destroying the asphalt, concrete or like material of a driveway, sidewall or even well manicured lawn which surrounds the drain pipe so as to expose its upper end, and further, which does not require that the flood control valve assembly be fixedly or permanently attached to the drain pipe itself. Any such flood control valve assembly that is developed should be removably attached to the drain pipe, and ideally, should be capable of being easily removed from its intended, operative position relative to a drain pipe or sewer pipe, and further, should be capable of having the various components thereof independently detached from one another and from the overall assembly for repair, replacement or maintenance thereof. In addition, an improved flood control valve assembly, of the type referred to herein, should be structurally adapted to be removably attached to a toilet, commode, water closet or like waste disposable facility and allow such facilities to flush or freely pass the intended waste material and objects therethrough. In doing so, the possibility of clogging, stoppage, or other obstruction of the system should be eliminated or at least significantly reduced.

SUMMARY OF THE INVENTION

The present invention relates to a flood control valve assembly structured to prevent the back flow of water from a drain pipes or main sewer system, such as, but not limited to, those found in underground parking garages, basements, etc., which typically are permanently installed. At least one embodiment of the flood control valve assembly of the present invention is structured for use with commodes, toilets, water closets and like facilities which are already existing in an erected building structure, and which prevent the back flow of sewage from a connected drain pipe and sewer system into the building in which the toilet facility is located. Accordingly, dependent on the specific application, at least one embodiment of the present invention can be used to prevent flooding of a building, dwelling or other area caused by an overload and a resulting back flow of a main drain or sewer system, which frequently occurs during storms, heavy rains or other adverse weather conditions.

More specifically, one embodiment of the present invention comprises a housing, which preferably, has a substantially elongated and hollow configuration, and which terminates at oppositely disposed, open ends, one of which may define an outer end and the other of which may define an inner end. Preferably, the housing is dimensioned such that its outer diameter or transverse dimension is at least minimally less than the interior diameter or transverse dimension of the drain or sewer pipe in which it is installed, in order that the housing may be disposed on the interior of the drain pipe. Most preferably, the housing is disposed within the drain pipe in correspondingly aligned position with the drain pipe, such that the outer, open extremity of the drain pipe is immediately adjacent or contiguous to the outer, open end of the housing.

One inventive feature of the present invention is the removable mounting or connection of the housing, as well as the remaining components of the flood valve assembly of the present invention, on the interior of the drain pipe. To accomplish such removable attachment, the present invention also comprises an attachment assembly, which is preferably adjustably disposed at least partially within the interior of the housing. The attachment assembly is preferably defined by at least one, but preferably, two cross members disposed in substantially transverse relation to one another, and further, which are specifically structured such that their length may be varied. A specific structural embodiment of each of the cross members may take the form of a hexagon shaped turnbuckle or "hex-turnbuckle" having a threaded bolt protruding from each opposite end thereof. Further, the opposite extremities of each of the threaded bolts preferably have a sharpened or pointed configuration which extends through pre-formed openings or apertures in the body of the housing such that the sharpened ends of the cross members may penetrate, and thereby, removably engage the interior surface of the standing drain pipe. By virtue of this interconnection, the housing is held in a preferred, concentric orientation within the drain pipe, but may be readily and quickly removed therefrom for purposes of repair, replacement or maintenance.

As explained in greater detail hereinafter, the attachment assembly comprising the one or two cross members also serves to retain a valve member on the interior of the housing. The valve member is preferably formed of a buoyant material, such that its position within the hollow interior of the housing is dependent not just upon gravity, but also by the collection of water and/or direction of water flow therethrough. Ideally, the valve member comprises a spherical configuration, such as a ball or bobber, which is specifically dimensioned and configured to freely move within the interior of the housing between the retaining cross members and a valve seat, which will briefly be described next, and in greater detail hereinafter.

The flood control valve assembly of the present invention also includes a valve seat. In at least one embodiment, the valve seat is integrally or otherwise fixedly mounted on or secured to a head assembly which is removably attached immediately adjacent to, and in certain preferred embodiments to be described in greater detailed hereinafter, to extend at least minimally outward from the outer open end of the housing. The head assembly has a hollow interior and an open proximal end disposed contiguous to or at least minimally outward from the outer open end of the housing. The opposite or distal open end of the head assembly is disposed within the housing in spaced relation to the outer end thereof, and the interior of the head assembly serves to define at least a portion of the flow path of water which passes through the housing from the outer, exposed open end of the standing drain pipe. The valve seat, which is a part of or secured to the head assembly is specifically dimensioned, disposed and configured to be sealingly engaged by the valve member to define a closed position of the valve seat and valve member. When the valve seat and valve member assume such a closed position, water will be prevented from passing back through the housing assembly, and accordingly, will be prevented from "back flowing" through the outer, exposed open end of the drain pipe.

Other structural features of at least one embodiment of the flood control valve assembly of the present invention include a sealing assembly, preferably in the form of an "O"-ring and/or other sealing or packing material secured and/or selectively positioned about the outer surface of the housing, and specifically dimensioned and configured to sealingly engage the interior surface of the drain pipe. Such sealing engagement between the outer surface of the housing and the interior surface or the drain pipe prevents the back flow or passage of water between the housing and the interior surface of the drain pipe. Accordingly, during flooding or like unusual conditions the water is thereby forced to pass into the open inner end of the housing and through the interior thereof, and will accomplish the forced positioning of the valve member into sealing engagement with the valve seat to prevent the aforementioned back flow of water out the open outer end of the housing.

Another embodiment of the flood control assembly of the present invention is structurally adapted to be secured to a toilet, commode, water closet, etc. in a manner which interconnects the toilet facility to the main drain or sewer system through a somewhat conventional drain pipe. A conventional water closet collar coupling or similar adaptor may be used to accomplish attachment of the housing of this embodiment of the flood control valve assembly to a toilet. Also, a variety of other couplings and/or reducer adaptor structures may also be used to effectively interconnect the housing of this embodiment to the conventional plumbing system associated with the dwelling or structure in which the toilet facility is located. As with the above described embodiments, the housing of this embodiment of the flood control valve assembly includes an elongated, substantially hollow interior along which a flow path is defined as water, sewage, disposable objects, etc. pass from the toilet facility into the housing and therefrom into an attached drain pipe leading to the main sewer system. Due to the fact that sewage, as well as dissolvable but at least partially solid objects are intended to be disposed of through flushing the toilet facility, this embodiment comprises a chamber secured to the housing 10, which preferably, is spaced outwardly therefrom. The chamber includes an open interior disposed in fluid communication with the hollow interior of the housing and with the flow path defined therein. The valve seat, which may be substantially equivalent to that described with the above set forth embodiments, is removably or otherwise connected, preferably to an outer open end of the housing. A valve member, preferably in the form of a buoyant material ball or like structure is at least partially supported by means of a retainer assembly.

The retainer assembly is at least partially disposed within the housing and is oriented and/or configured to normally retain the valve member within the open interior of the chamber and out of the flow path associated with the hollow interior of the housing. The retainer assembly is structured to allow the sewage and semi-solid waste materials to pass along the flow path of the housing without interfering with the passage of such waste material or causing a clogging of the housing or other parts of the drain system.

Accordingly, during normal flow conditions, which may be defined by sewage or water passing from the toilet facility, through the housing and eventually through the connected drain pipe to the main sewer system and also during "no-flow" conditions, the valve element will be retained within the open interior of the chamber and out of the flow path of the housing. However, during back flow conditions, as described above, water will rise upwardly from the drain pipe into the housing and also into the open interior of the chamber. Due to the fact that the valve element or ball is buoyant, it will rise with the back flow of water and be directed into the flow path within the hollow interior of the housing until is forced, by the rising back flow of water and/or sewage, into sealing engagement with the aforementioned valve seat. Flooding of a dwelling, building, etc. through the toilet facility will thereby be prevented.

Therefore, it is a primary object of the present invention to provide a flood control valve assembly removably connected to a conventional, permanently installed drain pipe or sewer pipe in a manner which will prevent the back flow of water therethrough.

Another primary object of the present invention is to provide a flood control valve assembly which allows the flow of water into a drain pipe in the conventional manner for the channeling of such water to the drain or sewer facilities while preventing the back flow of water through the drain pipe in an opposite direction.

Still another important object of the present invention is to provide a flood control valve assembly which may be easily installed and removed from its operative position relative to an existing, permanently installed drain pipe in a manner which will not destroy or otherwise damage the drain pipe and which will allow the removal and/or replacement of the entire flood control valve assembly or any associated component thereof.

It is also an important object of the present invention to provide a flood control valve assembly capable of having the various components thereof being detached or disconnected from one another and from their intended operative position for purposes of maintenance, repair and/or replacement.

It is yet another important object of the present invention to provide a flood control valve assembly capable of being removably attached to a fixed or permanently installed drain pipe and comprising a plurality of components which are formed from durable, high strength, non-corrosive material of simple design and structure, thereby rendering the valve assembly commercially available to a large segment of the consuming public.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

As discussed in greater detail hereinafter and as shown in the accompanying drawings, the flood control assembly of the present invention comprises a number of embodiments which are specifically intended to prevent the flooding of interior portions of buildings or dwellings as well as other areas, such as public or private, open-air or closed garages and similar structures or areas.

Figure 12:
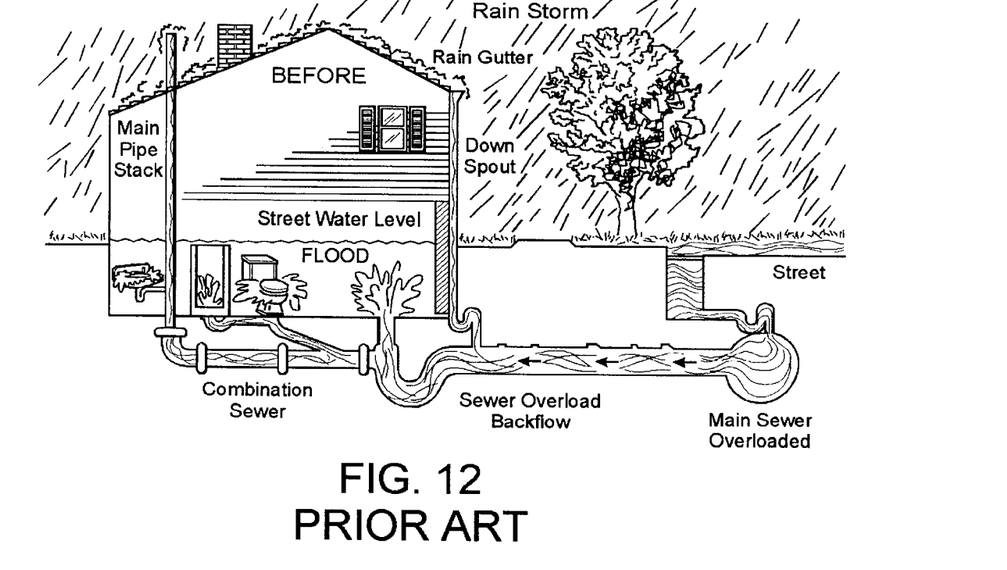
FIG. 12 is a perspective view of a prior art system wherein a plurality of drain pipes communicating with various structures within a building or dwelling are connected to a conventional sewer or drain system.
Figure 13:
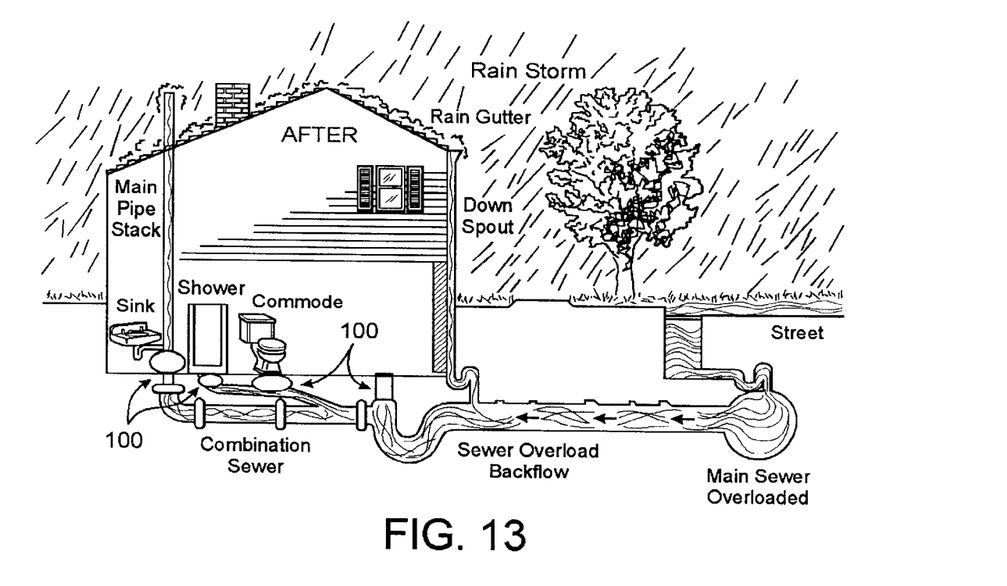
FIG. 13 is a perspective view similar to that of FIG. 12, wherein one or more of the different embodiments of the flood control assembly of the present invention are installed at appropriate locations between the various facilities and the main sewer or drain system.
Figure 14:
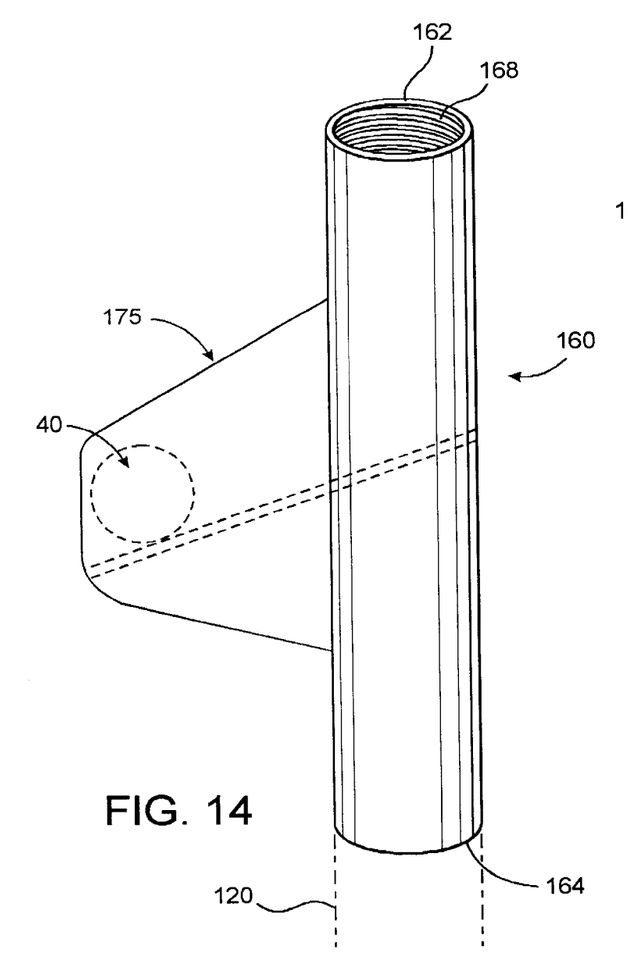
FIG. 14 is a perspective view in partial phantom of another embodiment of the flood control assembly of the present invention.
Figure 15:
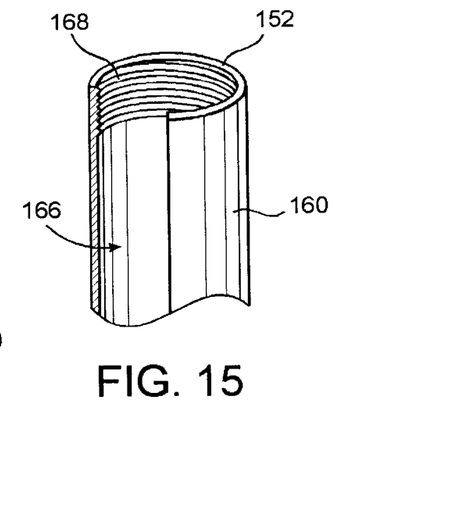
FIG. 15 is a detailed view in partial cutaway of portions of a housing of the embodiment of FIG. 14.

With reference to FIG. 12, it is to be understood that during certain adverse weather conditions, such as storms, heavy rains, etc., a main sewer or drain system can be easily over loaded causing a back flow of water and/or sewage therethrough. This back flow frequently causes a flooding of one or more areas of the aforementioned buildings, dwellings, garages, etc. by passing through various facilities connected to the main drain or sewer system in a conventional fashion. As shown in the prior art system of FIG. 12, the various facilities which are commonly flooded, include floor drains found in basements, commodes, showers stalls or bath tubs, sinks, as well as main pipe stacks and down drains communicating with the exterior of the building but also connected to the aforementioned main drain or sewer system. As demonstrated in FIG. 13, the flood control valve assembly of the present invention, each generally represented as 100 regardless of the particular embodiment utilized, is designed and structured to be sufficiently versatile so as to protect each of the different types of facilities or structures. As will be emphasized in greater detail hereinafter, the specific embodiments are structured to accommodate and be adaptable to different ones of the aforementioned facilities and, when appropriately installed, will prevent back flow of water and/or sewage from the main sewer or drain system through a drain pipe connected to the valve assembly.

Figure 1A:
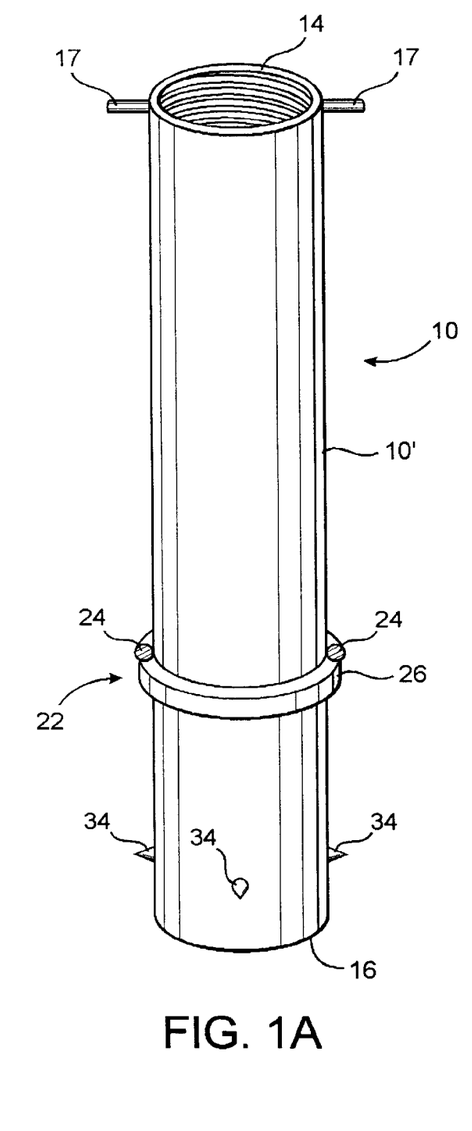
FIG. 1A is a perspective view of a housing portion of the flood control valve assembly of the present invention.
Figure 1B:
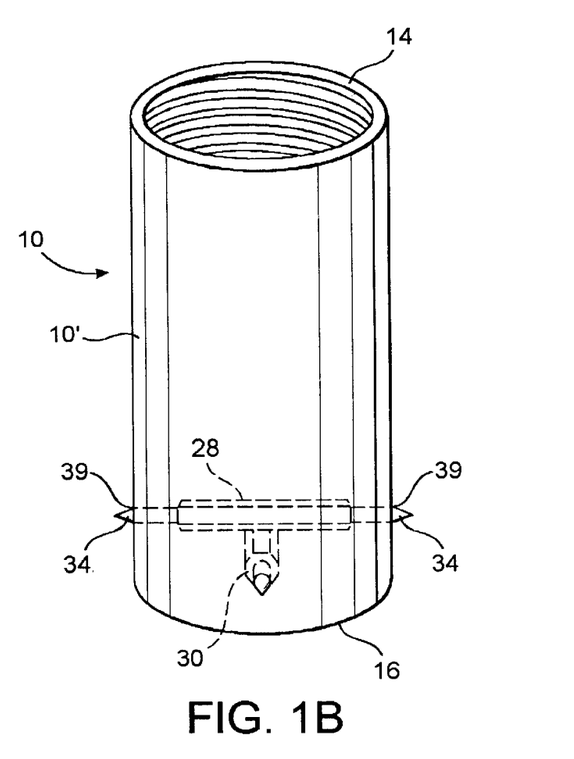
FIG. 1B is a perspective view of the embodiment of FIG. 1A in partial phantom.
Figure 8:
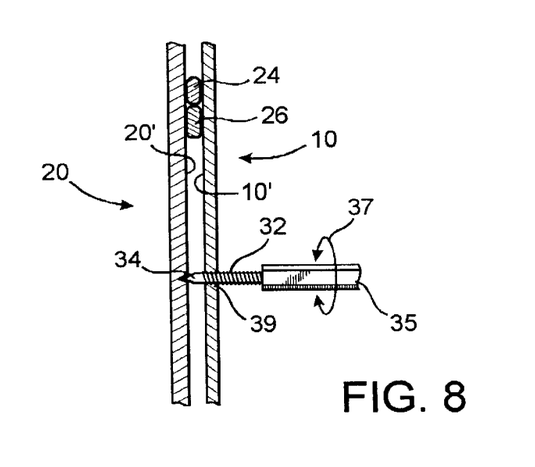
FIG. 8 is a longitudinal sectional view in partial cut-away of certain structural features of the embodiments of FIGS. 1 through 6.

Therefore, one embodiment of the flood control valve assembly of the present invention comprises a housing, generally indicated as 10, which preferably has an elongated configuration and a hollow interior 12 extending along the length thereof. The housing 10 includes an upper or outer open end, generally indicated as 14, and a lower open end, generally indicated as 16. The housing 10 may be formed from any of a variety of relatively lightweight, durable, high strength, non-corrosive materials such as plastic, PVC, or the like, and is specifically structured to come in a variety of sizes so as to be removably attached to and to fit within anyone of a plurality of different sized drain or sewer pipes, generally indicated as 20, as shown in FIG. 8, which may be fixedly and/or permanently installed at any of a variety of conventional locations to accomplish the drainage and/or removal of water from such a site or location. As will become more apparent hereinafter, the transverse dimension or outside diameter of the housing 10 is such as to fit within an end portion of the vertical or horizontal, permanent drain pipe 20 and be at least minimally spaced from the interior surface 20' thereof, as shown in FIGS. 3 and 8. Regardless of the size of the spacing between the exterior surface 10' of the housing 10, see FIGS. 1-B and 2, and the interior surface 20' of the standing drain pipe 20, it is preferable to prevent water from passing therebetween. Accordingly, one preferred embodiment of the present invention comprises a sealing means generally indicated as 22 in FIG. 1A. The sealing means 22 may comprise an O-ring or like gasket member 22 and/or a packing joint stopper 26 both of which are secured about the exterior surface 10' of the housing 10 in the manner shown both in FIGS. 1A and 8. In the embodiment of FIG. 1, the O-ring 24 may be adjustably positioned along the length of the exterior surface 10' of the housing 10 so as to selectively locate the O-ring in a desired location and into sealing engagement with the interior surface 20' of the standing drain pipe 20.

Figure 3:
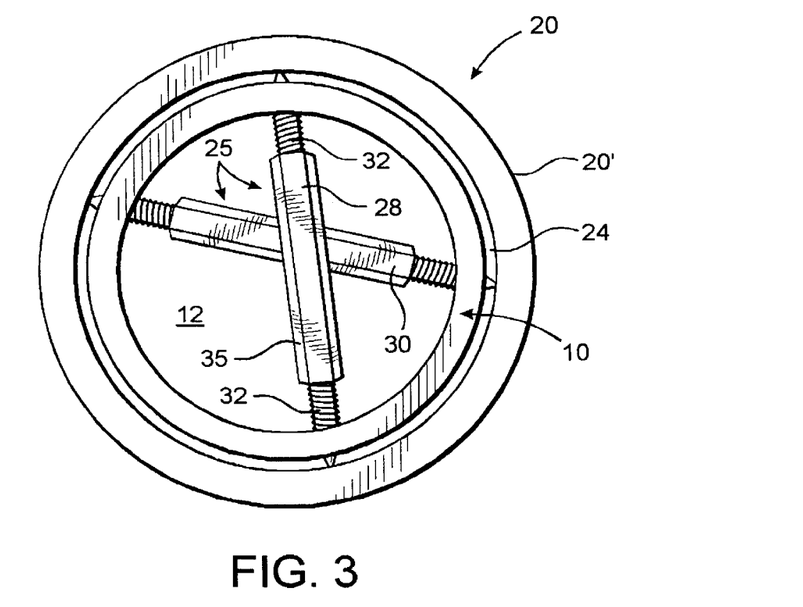
FIG. 3 is a top, transverse sectional view showing another embodiment of the present invention.
Figure 4:
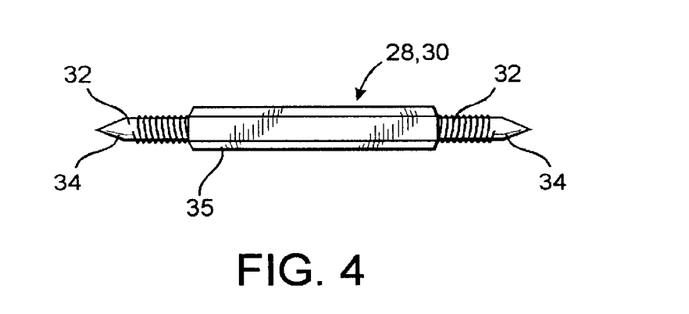
FIG. 4 is a perspective view in detail showing certain structural components of the embodiment of FIG. 3.

With primary reference to FIGS. 3 and 4, one embodiment of the flood control valve assembly of the present invention further includes an attachment assembly, generally indicated as 26, comprising at least one but preferably, at least two cross members 28 and 30. The cross members 28 and 30 are disposed on the interior 12 of the housing 10 in a transverse relation to the length thereof. In a most preferred embodiment, each of the cross members 28 and 30 may be defined a "hex-turnbuckle" shown in detail in FIG. 4. More specifically, each of the cross members 28 and 30 preferably includes oppositely disposed, bolt segments, as at 32, each of which has an extremity configured into a pointed or sharpened configuration, as at 34. The operative structuring of the turnbuckle defining each of the cross members 28 and 30 is such that the length or longitudinal dimension thereof may be adjusted so as to force the bolt segments 32 outwardly or inwardly relative to the main body 35 by rotation of the body 35 in accordance with directional arrow 37 shown in FIG. 8. With regard to the mounting or installation of the cross members 28 and 30, aligned, oppositely disposed pairs of apertures as at 39 are formed in an appropriate location in the sidewall of the housing 10. Each of the cross members 28 and 30 are disposed within the interior of the housing 10 such that the extremities of the bolt segments 32 extend through the apertures 39 and outwardly from the exterior surface 10' of the housing 10 into penetrating engagement with the interior surface 20' of the standing drain pipe 20 as shown. By virtue of this attachment, the housing 10 of the flood control valve assembly may be removably attached within the interior of the drain pipe 20 in a quick and easy manner, and just as easily, can be detached therefrom so as to accomplish removal of the housing and the various associated components from the drain pipe 20.

Figure 5:
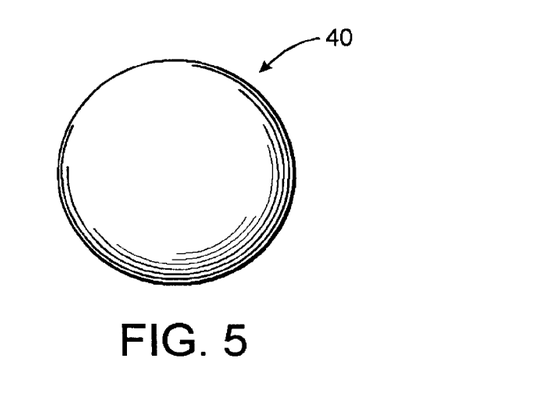
FIG. 5 is perspective view of a valve member associated with the flood control valve assembly of the present invention.

With reference to FIGS. 3 and 5 it should be apparent that the transverse orientation of the cross members 28 and 30 relative to one another and to the longitudinal axis of the housing 10 serves also to retain the valve member, generally indicated as 40 in FIG. 5, within the hollow interior 12 of the housing 10. More specifically, the valve member 40 preferably has a substantially spherical configuration and accordingly is generally defined as a ball valve and is specifically formed of a buoyant material. In addition, the outer diameter of the valve member 40 is such as to be significantly less than the interior diameter of the housing 10 thereby allowing the valve member 40 to freely move within the interior 12 of the housing 10 in accordance with the direction of water flow therethrough. It should be apparent therefore that when water entering the exposed outer end of the standing drain pipe 20 in the conventional and intended manner, passes along a flow path defined at least in part by the interior 12 of the housing 10, it will force the buoyant material valve member 40 into captured or retained engagement with the cross members 28 and 30. Naturally, flow of water in the opposite direction, during back flow conditions, through the interior 12 of the housing 10 will cause the buoyant material valve member 40 to travel in an opposite direction towards the outer, open end of the housing 10 and into a closed position with a valve seat 50, to be defined hereinafter.

Figure 6:
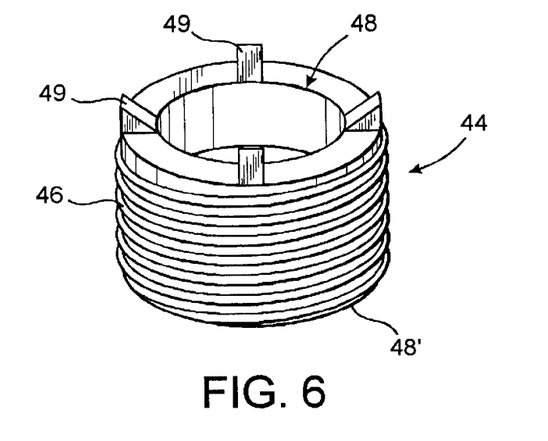
FIG. 6 is a perspective view of another component of the flood control valve assembly of the present invention.
Figure 7:
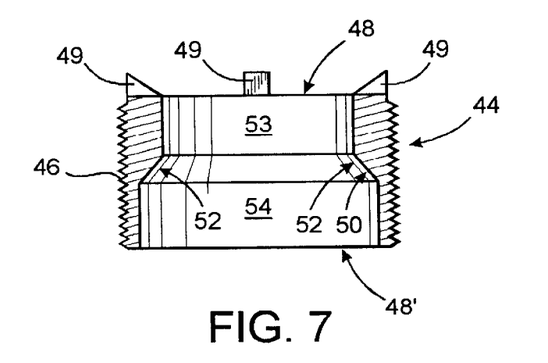
FIG. 7 is a longitudinal sectional view of the embodiment of FIG. 6.

The flood control valve assembly of the present invention further comprises a head assembly which in one embodiment disclosed in FIGS. 6 and 7 is generally represented as 44. In the structural embodiment of the head assembly 44, a threaded configuration is integrally formed on the outer surface thereof as at 46. The head assembly 44 also includes an open proximal end generally 48 and an open distal end generally 48'. In addition, a valve seat generally indicated as 50 is integrally formed on the interior surface of the head assembly 44 and is provided in the form of a transitional taper 52 disposed between the upper or outer portion 53 of the interior of the head assembly 44 and the lower or inner portion of the interior of the head assembly 44 as at 54. It is clearly shown that the inner diameter or equivalent transverse dimension of the hollow portion 53 is significantly less than that of the inner or lower portion 54 and more specifically, the disposition and transverse dimension of the valve seat 50 is cooperatively configured and dimensioned with the dimension and configuration of the spherical, valve member 40 to accomplish a sealing engagement therebetween. As a result, flow of water in the opposite direction towards the open, outer end 14 of the housing 10 will force the valve member, at least partially because of the buoyant material from which it is formed, into a sealing engagement with the valve seat 50 thereby preventing the "back flow" of water to continue beyond the valve seat 50 and prevent the issuing of water through the open end 14 of the housing 10. Again, due to the buoyant material from which the valve member 40 is formed, the valve member 40 will automatically "unseat" from the valve seat 50 to allow the flow of water through the outer end 14 and into the interior of the head assembly 44 and housing 10 in the intended manner.

Figure 2:
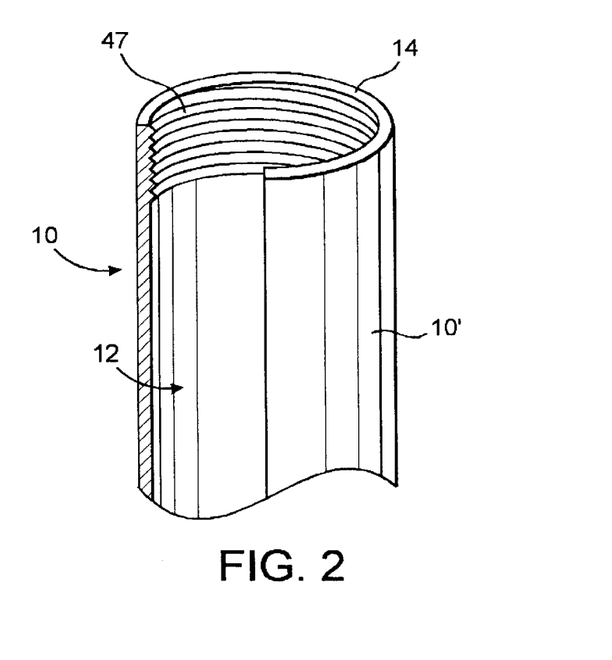
FIG. 2 is a perspective view in partial cut-away showing interior portions of the embodiment of FIG. 1.

The head assembly 44 is removably mounted immediately adjacent to the outer open end 14 of the housing 10 and on the interior thereof due to the threaded portion 46 formed on the outer surface of the head assembly 44 disposed in matting engagement with the threaded portion 47 formed on the interior 12 of the housing 10 in the location shown in FIG. 2. In order to facilitate rotation of the head assembly 44 relative to the housing 10, one or more up-standing nipples as at 49 may be mounted to project outwardly from the periphery surrounding the open proximal end 48 of the head assembly 44 by facilitating engagement with an appropriately structured tool. Another structural feature of the embodiment of the housing 10 of FIG. 1A is the provision of a plurality of lugs 17 removably attached adjacent the outer end 14. Lugs 17 initially extend outwardly from exterior surface 10' a sufficient distance to overlie the outer most end of the drain pipe 20 and temporarily support the housing 10 thereon in an intended position within the standing drain pipe 20 prior to the cross members 28 and 30 being attached to the interior surface 20' of the drain pipe as shown in FIG. 8. Once the housing 10 is attached in its intended position by securement of the cross members 28 and 30, the lugs 17 are broken away or otherwise removed.

Figure 9:
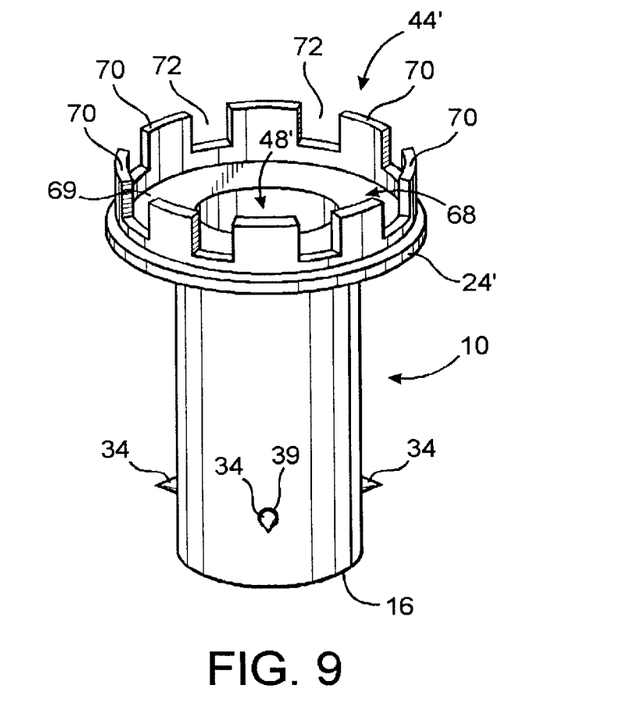
FIG. 9 is a perspective view of another preferred embodiment of the present invention.
Figure 10:
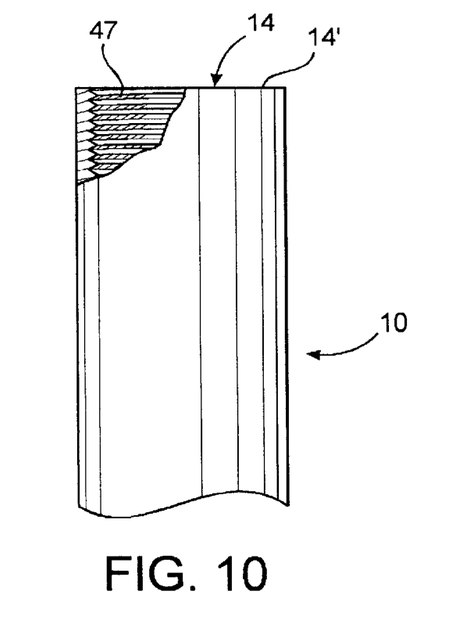
FIG. 10 is a front view in partial cut-away and section of a portion of the embodiment of FIG. 9.
Figure 11:
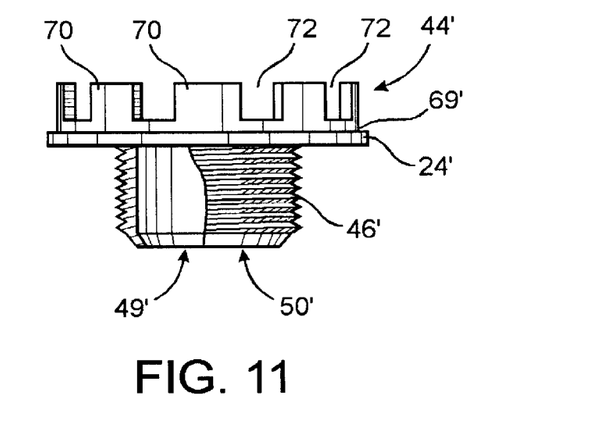
FIG. 11 is a front view in partial cut-away and section of a portion of the embodiment of FIG. 9.

Another, embodiment of the flood control valve assembly is shown in FIGS. 9 through 11 and includes the housing 10 being substantially equivalently structured to the embodiment of FIG. 1 including an open outer end 14 and an oppositely disposed open inner end 16 both of which communicate with the hollow interior 12 of the housing 10. Similarly, attachment of the housing to the interior of the drain pipe 20 is accomplished through the provision of the cross members 28 and 30 in the manner disclosed and described with reference to FIGS. 3, 4 and 8. However, the embodiment of FIGS. 9 through 11 comprises a head assembly generally indicated as 44' having a hollow interior and an open proximal end 48' an open distal end 49' communicating with the hollow interior thereof. Similarly, the exterior surface is threaded along at least a portion thereof as at 46' for interconnection to the internal threads 47 formed along a portion of the interior surface of the housing 10 as also shown in FIG. 10. However, the head assembly 44' includes a outwardly disposed cap generally indicated as 68 having a somewhat annular configuration defined at least in part by a platform portion 69. A plurality of spaced apart fingers 70 extend substantially perpendicularly outward from the exposed surface of the platform 69 and are separated by a plurality of spaces 72. The provision of the plurality of fingers 70 and alternately disposed spaces 72 facilitates the use of a wrench or like elongated, rigid material tool member (not shown) to cause rotation of the head assembly 44' relative to the housing 10 so as to accomplish attachment and detachment of these two components. Other features of the head assembly 44' include a valve seat 50' disposed and dimensioned to be sealingly engaged by the buoyant material valve member 40 as described in detail with reference to FIG. 5.

Further, the sealing assembly associated with the embodiment of FIGS. 9 through 11 comprises a sealing member preferably in the form of an O-ring 24' normally disposed in engaging, confronting relation with the undersurface 69' of the platform 69. Due to the relative dispositions and dimensions of both the O-ring 24' and the platform 69, the O-ring 24' is "clamped" or otherwise disposed in a fixed position between the undersurface 69' and the outer peripheral edge 14' of the upper open end 14 of the housing 10 in a manner such that the O-ring 24' extends outwardly from the platform 69 into an engageable sealing relation with an interior surface 20' of a permanently installed drain or sewer pipe 20.

Another preferred embodiment of the present invention is shown in FIGS. 14 through 17 and includes an elongated housing generally indicated as 160 including an open outer end 162 and an open inner end 164 communicating with a hollow interior 166 extending along the length of the housing 160. The internal surface of the hollow interior 166, immediately adjacent to the open end 162, may be threaded so as to accommodate a head assembly generally indicated as 44 and discussed in detail with reference to FIG. 6. In addition, the head assembly 44 may be fixedly or integrally secured to a valve seat generally indicated as 50 and at least partially defined by the transitional portion 52, as also described in detailed with regard to the embodiment of FIG. 7. The housing 160 is secured to a drain pipe 120, which in turn, is connected in fluid communication with a main drain or sewer system of the type shown in FIGS. 12 and 13.

Figure 18:
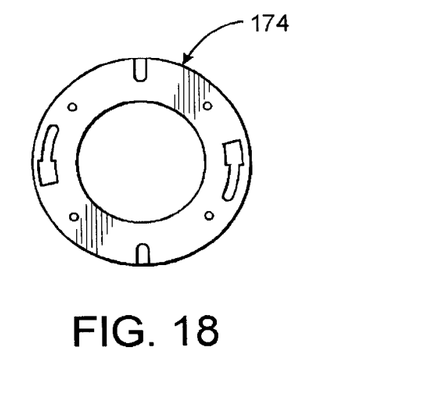
FIG. 18 is a water closet collar or adaptor structure which may be used in securing the housing of the embodiment of FIGS. 14 through 16 to a commode, water closet, etc.
Figure 19:
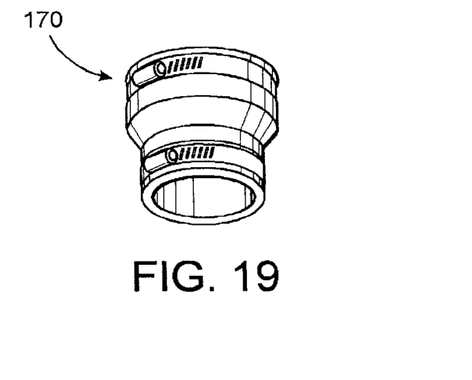
FIG. 19 is a perspective view of another adaptor/reducer coupling structure which may be used to interconnect the housing of the embodiment of FIGS. 14 through 16 to a different size drain pipe or other facility.
Figure 20:
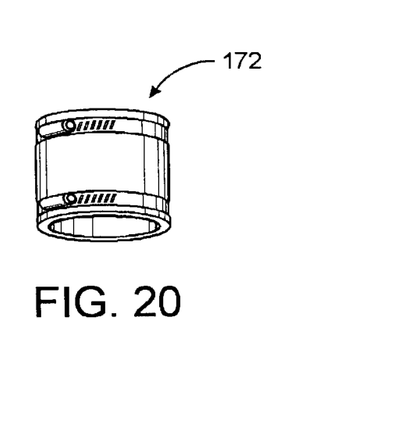
FIG. 20 is a perspective view of an adaptor/coupling structure which may be utilized to connect the housing in the embodiment of FIGS. 14 through 16 to a drain facility or main drain system of the same size.

Interconnection of the housing 160 to the drain pipe 120 may be accomplished by customized or substantially conventional reducer type adaptors or couplings 170 and 172, as shown in FIGS. 19 and 20. Similarly, the opposite, outer open end 162 may be interconnected to a toilet, commode, water closet or like facility of the type designed to dispose of sewage, disposable objects, etc., by means of a water closet collar or adaptor 174, as shown in FIG. 18.

Figure 16:
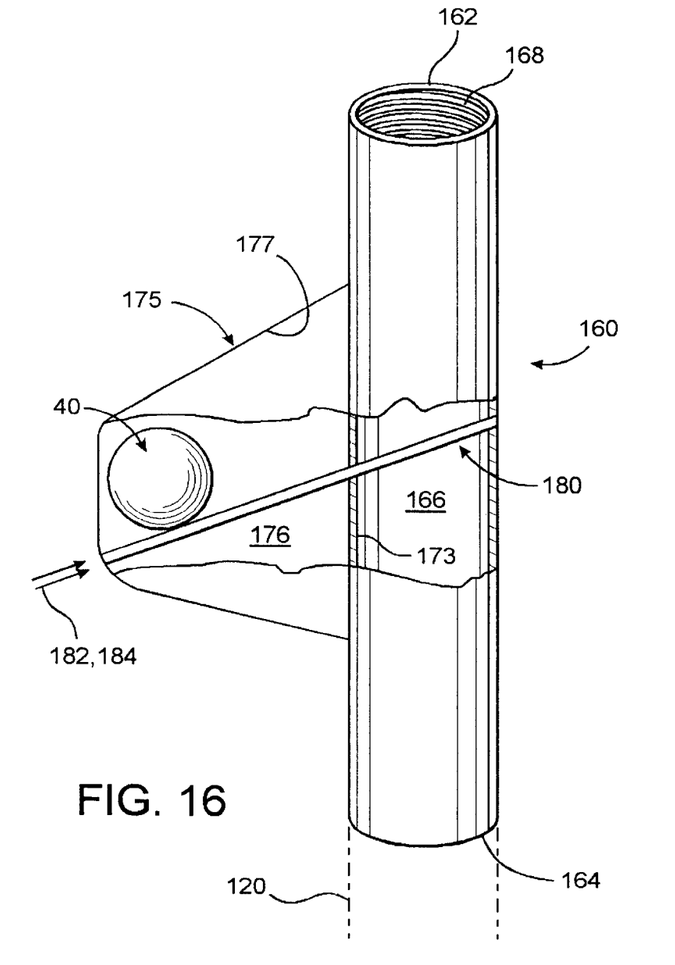
FIG. 16 is a perspective view of the embodiment of FIG. 14 in partial cutaway showing interior structural details and components associated therewith.

In the additional preferred embodiment as shown in FIGS. 14 through 17, the housing 160 is fixedly, integrally or otherwise connected to a chamber generally indicated as 175. As shown in FIG. 16, the chamber 175 includes an open interior 176 and an open face as at 178. The open face 178 is disposed in contiguous relation to the hollow interior 166 of the housing 160 as well as to the flow path extending along the length of the hollow interior 166. For purposes of clarity in describing this embodiment, the flow path may be considered to be located coincident to the central longitudinal axis of the hollow interior 166 of the housing 160. The open face 178 is also disposed in contiguous relation to the open interior 176 of chamber 175, and thereby establishes fluid communication between the open interior 176 and the flow path within the hollow interior 166.

Figure 17:
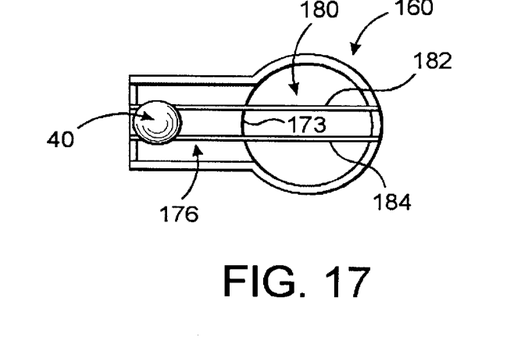
FIG. 17 is a transverse sectional view of FIG. 16.

As best shown in FIGS. 16 and 17, one feature of this embodiment comprises the provision of a retainer assembly generally indicated as 180. The retainer assembly 180 comprises at least one, but preferably two or more retainer members 182 and 184 at least partially disposed within the hollow interior 166 of the housing 160 and also at least partially disposed within the open interior 176 of the chamber 175. The one or more retainer members 182 and 184 are disposed and/or mounted in an angularly inclined, substantially transverse relation to the flow path and/or the length of the hollow interior 166 and in at least partially supporting relation to the valve element or ball 40. The incline or angular orientation of the retainer assembly 180 serves to direct and retain the valve element 40 within the open interior 176 and out of the flow path extending along the length of the hollow interior 166 during what may be referred to as "normal flow conditions". Normal flow conditions may be defined as comprising a flow of liquid, water, sewage, etc. through the hollow interior 166 and along the flow path into the drain pipe 120 as such water or sewage is flushed from a toilet facility. Also normal flow conditions may also be defined herein as the hollow interior 166 and the flow path empty or devoid of water flow. Under such normal flow conditions the structure, configuration and/or orientation of the retainer assembly 180, including the one or more retainer members 182 and 184, serve to direct the valve element 40 into the position shown in FIGS. 16 and 17. However, during "back flow conditions" when water or sewage rises up through the drain pipe 120 and into the hollow interior 166, such water, sewage, etc. will also pass through the open face 178 into the open interior 176 of the chamber 175. The buoyancy of the valve element 40 will thereby cause it to rise with the back flow of water or sewage and pass into the hollow interior 166 and along the flow path. The placement of the valve element 40 back into the hollow interior 166 will be further facilitated by a structuring or configuring of the chamber 175 and/or at least one portion or interior surface thereof, as at 177, so as to direct the movement of the valve element 40 towards the flow path 166. By way of example, the chamber wall or interior surface may be angularly inclined or otherwise configured to direct the travel of the valve element 40, as it rises with the back flow of water, into the flow path, as mentioned above.

As emphasized, the embodiment of FIGS. 14 through 17 is adapted to be interconnected to a toilet, commode, or like toilet facility, wherein sewage and/or semi-solid objects or material are intentionally disposed of by being flushed into the hollow interior 166 of the housing 160 and along the flow path defined therein. Accordingly, the retainer assembly 180 is structured to allow the passage of sewage and other intended waste materials along the aforementioned flow path, without causing a clogging or blockage within the hollow interior 166. Therefore, when a plurality of retainer members 182 and 184 are used they are preferably disposed a sufficient spaced apart distance to allow passage of the intended waste material therethrough. However, the distance between the retainer member 182 and 184 is insufficient to allow the passage therethrough of the valve element 40.

In at least one embodiment, the one or more retainer members 182 and 184 may be formed from an elongated substantially high strength, rigid material such as, but not limited to, stainless steel or the like and have a relatively small transverse dimension so as to significantly reduce the possibility of semi-solid material, sewage, etc. becoming attached thereto. Also, the spacing on the exterior of the spaced apart retainer members 182 and 184 should be specifically dimensioned so as to allow the passage of the aforementioned sewage along the flow path but prevent the passage of the valve element beyond the retainer assembly 180 and into the drain, pipe 120.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A flood control assembly disposed in fluid communication with a drain pipe, said assembly comprising:
   a) a housing having a hollow interior terminating at oppositely disposed, open, upper and lower ends, said housing connected to the drain pipe at said lower end and extending outwardly therefrom into a substantially vertical orientation,
   b) a head assembly removably secured within said upper end of said housing and including a hollow interior and open proximal and distal ends,
   c) said head assembly including a valve seat fixedly mounted thereon and removable therewith relative to said housing, said head assembly, said valve seat and said upper end collectively defining at least a portion of a flow path through said housing,
   d) a substantially vertically oriented chamber connected to said housing and including an open interior disposed in fluid communication with said hollow interior and in spaced relation to said flow path,
   e) a valve member formed of buoyant material and movably contained within either said housing and along said flow path or within said open interior of said chamber substantially removed from said flow path,
   f) said valve member disposable into and out of sealing engagement with said valve seat dependent on direction of liquid flow along said flow path, and
   g) a retainer assembly connected to said housing in an at least partially supporting relation to said valve member, said retainer assembly disposed to normally retain said valve member out of said flow path.

2. An assembly as recited in claim 1 wherein said retainer assembly is disposed to normally retain said valve member within said open interior of said chamber.

3. An assembly as recited in claim 1 wherein said retainer assembly is at least partially mounted within said open interior of said chamber.

4. An assembly as recited in claim 1 wherein said retainer assembly is at least partially mounted within said hollow interior.

5. An assembly as recited in claim 4 wherein said retainer assembly comprises at least one retainer member disposed within said flow path and structured to direct said valve member out of said flow path during normal flow conditions.

6. An assembly as recited in claim 5 wherein said normal flow conditions is at least partially defined by a flow of water along said flow path from said housing to the drain pipe.

7. An assembly as recited in claim 6 wherein said normal flow conditions is further defined by said hollow interior and said flow path being substantially devoid of water flow therein.

8. An assembly as recited in claim 7 wherein said one retainer member is disposed to substantially retain said valve member within said open interior during said normal flow conditions.

9. An assembly as recited in claim 5 wherein said one retainer member is oriented in an inclined substantially transverse relation to said flow path and in communicating relation to said open interior of said chamber.

10. An assembly as recited in claim 8 wherein said retainer assembly comprises at least two retainer members each being at least partially disposed within said flow path and collectively structured to substantially retain said valve member within said open interior of said chamber during said normal flow conditions.

11. An assembly as recited in claim 10 wherein said two retainer members are disposed in spaced relation to one another a distance sufficient to allow passage of water flow therethrough and insufficient to allow passage of said valve member therethrough.

12. An assembly as recited in claim 11 wherein said two retainer members each include an elongated configuration at least partially disposed within both said hollow interior of said housing and said open interior of said chamber.

13. An assembly as recited in claim 11 wherein each of said retainer members are oriented in an inclined substantially transverse relation to a length of said flow path and in communicating relation with both said hollow interior of said housing and said open interior of said chamber.

14. An assembly as recited in claim 1 wherein said valve seat comprises an annular configuration disposed in surrounding relation to said flow path and including a transitional tapered portion disposed and dimensioned to sealingly engage said valve member upon a back flow of liquid from the drain pipe through said housing to a location at least substantially adjacent said valve seat.

15. An assembly as recited in claim 14 wherein said valve member comprises a ball.

16. A flood control assembly disposed in fluid communication with a drain pipe, said assembly comprising:
   a) a housing connected to the drain pipe and comprising a substantially elongated hollow interior terminating at oppositely disposed, open, outer and inner ends,
   b) a head assembly removably secured within said outer end of said housing and including a hollow interior and open proximal and distal ends,
   c) said head assembly including a valve seat fixedly mounted thereon and removable therewith relative to said housing, said head assembly, said valve seat and said outer end collectively defining at least a portion of a flow path through said housing,
   d) a chamber connected to said housing and including an open interior disposed in fluid communication with said hollow interior and in spaced relation to said flow path,
   e) a valve member formed of buoyant material movably contained within either said housing along said flow path or within said open interior of said chamber, substantially removed from said flow path,
   f) a retainer assembly connected to said housing in at least partially supporting relation to said valve member, said retainer assembly disposed to retain said valve member out of said flow path during normal flow conditions,
   g) said valve member disposable into and out of sealing engagement with said valve seat dependent upon direction of liquid flow along said flow path,
   h) said chamber being at least partially structured to facilitate travel of said valve element from said open interior into said hollow interior of said housing,
   i) said chamber including at least one interior surface extending from said open interior of said chamber to said hollow interior of said housing and oriented to direct said valve member from said open interior into said flow path, and
   j) said chamber disposed laterally outward from said housing and including an open face contiguous to both said open interior of said chamber and said hollow interior of said housing, said open face being vertically oriented in substantially parallel relation to the length of said housing and sufficiently dimensioned to allow passage of said valve member and liquid flow therethrough and between said open interior and said path.

17. An assembly as recited in claim 16 wherein said normal flow conditions is at least partially defined by a flow of water along said flow path from said housing to said to the drain pipe; said normal flow conditions further defined by said hollow interior and flow path being devoid of water flow therethrough.

18. An assembly as recited in claim 17 wherein said retainer assembly comprises at least one retainer member disposed within said flow path and structured to direct said valve member into said open interior of said chamber during said normal flow conditions.

19. An assembly as recited in claim 18 wherein said one retainer member is oriented in an inclined substantially transverse relation to said flow path and in adjacent, communicating relation to said open interior of said chamber.

20. An assembly as recited in claim 17 wherein said retainer assembly comprises at least two retainer members disposed in spaced relation to one another and positioned at least partially within said flow path, said two retainer members collectively structured to substantially retain said valve member within said open interior during said normal flow conditions; said two retainer members disposed a spaced apart distance sufficient to allow passage of liquid flow therethrough and insufficient to allow passage of said valve member therethrough.

21. An assembly as recited in claim 20 wherein said two retainer members each include an elongated configuration oriented in an inclined substantially transverse relation to a length of said flow path and in communicating relation with both said hollow interior of said housing and said open interior of said chamber.

22. An assembly as recited in claim 16 wherein said valve seat comprises an annular configuration disposed in surrounding relation to said flow path and including a transitional tapered portion disposed and dimensioned to sealing engage said valve member upon a back flow of liquid from the drain pipe through said housing to a location substantially adjacent said valve seat.

* * * * *